United States Patent
Nishimura et al.

(10) Patent No.: US 9,066,018 B2
(45) Date of Patent: Jun. 23, 2015

(54) IMAGE DISPLAY DEVICE

(75) Inventors: Kenji Nishimura, Kanagawa (JP); Azusa Gojyo, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 84 days.

(21) Appl. No.: 13/985,833

(22) PCT Filed: Mar. 8, 2012

(86) PCT No.: PCT/JP2012/001585
§ 371 (c)(1),
(2), (4) Date: Aug. 15, 2013

(87) PCT Pub. No.: WO2012/132257
PCT Pub. Date: Oct. 4, 2012

(65) Prior Publication Data
US 2013/0321688 A1    Dec. 5, 2013

(30) Foreign Application Priority Data

Mar. 28, 2011 (JP) ................................. 2011-070231

(51) Int. Cl.
*H04N 5/222* (2006.01)
*H04N 5/232* (2006.01)
*G01C 21/36* (2006.01)
*G06T 11/00* (2006.01)

(52) U.S. Cl.
CPC ........ *H04N 5/23293* (2013.01); *G01C 21/3647* (2013.01); *G06T 11/00* (2013.01)

(58) Field of Classification Search
CPC .................................................. H04N 5/23293
USPC ....................................... 348/333.12, 333.03
See application file for complete search history.

(56) References Cited

U.S. PATENT DOCUMENTS 7,408,137 B2    8/2008  Sawachi
2006/0001757 A1*  1/2006  Sawachi .................. 348/333.12
(Continued)

FOREIGN PATENT DOCUMENTS

| JP | 2002341755 A | 11/2002 |
|---|---|---|
| JP | 2002369189 A | 12/2002 |
| JP | 2006020166 A | 1/2006 |
| JP | 2007127437 A | 5/2007 |

OTHER PUBLICATIONS

International Search Report dated Apr. 17, 2012, for corresponding International Application No. PCT/JP2012/001585, 3 pages.

*Primary Examiner* — Christopher K Peterson
(74) *Attorney, Agent, or Firm* — Seed IP Law Group PLLC (57) ABSTRACT

Disclosed is a technique for providing an image display device enabling a user to understand the entire correspondence relationship between a three-dimensional photographed image and a two-dimensional map image. According to the technique, when a photographed image and a map image in the imaging position are separately displayed on the screen of an image display unit 33, a map drawing unit 24 reads the position information (x, y) of the camera and the azimuth angle $\phi$ of the camera, reads a view angle $\theta$ of the camera, and reads map data around the imaging range of the camera using the position information (x, y) of the camera to process and draw the map image so that the view angle $\theta$ and the azimuth angle $\phi$ match the view angle $\theta$ and the azimuth angle $\phi$ of the photographed image taken by the camera.

20 Claims, 6 Drawing Sheets

(56) References Cited

U.S. PATENT DOCUMENTS

| | | | |
|---|---|---|---|
| 2006/0190812 A1* | 8/2006 | Ellenby et al. | 715/512 |
| 2009/0115855 A1* | 5/2009 | Gotoh et al. | 348/207.11 |
| 2009/0141966 A1* | 6/2009 | Chen et al. | 382/154 |
| 2009/0262145 A1 | 10/2009 | Akita et al. | |
| 2011/0141141 A1* | 6/2011 | Kankainen | 345/632 |

* cited by examiner

O      CAMERA POSITION
A,B    VERTICES OF STORAGE REGION

FIG. 6

A,B    END POINTS OF BORDER LINE
C       INTERSECTION BETWEEN AUXILIARY LINE 164 AND AB

FIG. 7

IMAGE DISPLAY DEVICE

TECHNICAL FIELD

The present invention relates to an image display device which separately displays by a division a photographed image and a map image in a position where the photographed image is taken on a screen, and particularly to an image display device which enables a user to understand geographic information more intuitively by displaying an image with increased visibility by clarifying the correspondence relationship between the photographed image and the map image separately displayed on the screen.

BACKGROUND ART

An in-vehicle or portable car navigation device is widely prevalent as a display device which shows a user geographic information. Moreover, in recent years, there is known a navigation device which displays a photographed image of an actual landscape taken by an in-vehicle camera and a navigation map image on a screen divided into two regions such as, for example, a right region and a left region, and which, when a user specifies either one of a structural object on the photographed image and a structural object on the map image on the screen, highlights the other structural object, so that the user is able to understand information around the user more intuitively (for example, refer to Patent Document 1 described below).

PRIOR ART DOCUMENTS

Patent Documents

Patent Document 1: Japanese Patent Application Publication No. 2007-127437 (claim 1, FIG. 2)

SUMMARY OF THE INVENTION

The conventional display device, however, merely highlights the other structural object when the user specifies either one of the structural object on the photographed image and the structural object on the map image. Therefore, the display device has had a problem that it is difficult for the user to understand at a glance the entire correspondence relationship between the photographed image and the map image because, from a visual viewpoint, the photographed image is a three-dimensional image and the map image is a two-dimensional image.

In view of the problem of the conventional technique, an object of the present invention is to provide an image display device enabling a user to understand at a glance the entire correspondence relationship between a three-dimensional photographed image and a two-dimensional map image in a position where the photographed image is taken when the photographed image and the map image are separately displayed on a screen.

In order to achieve the above object, the present invention provides an image display device which separately displays by a division a photographed image taken by an imaging unit and a map image on a screen, the image display device including: a unit which acquires a view angle, an imaging position, and an imaging direction of the imaging unit; and a unit which processes the map image so that the direction of the map image of the vicinity of the acquired imaging position matches the acquired imaging direction and so that the view angle of the map image matches the acquired view angle of the imaging unit.

Due to this configuration, when a three-dimensional photographed image and a two-dimensional map image in a position where the photographed image is taken are separately displayed on a screen, the photographed image and the map image are displayed with matched direction and view angle. Therefore, a user is able to understand at a glance the entire correspondence relationship between the photographed image and the map image.

According to the present invention, when a three-dimensional photographed image and a two-dimensional map image in a position where the photographed image is taken are separately displayed on a screen, a user is able to understand at a glance the entire correspondence relationship between the photographed image and the map image.

DESCRIPTION OF EMBODIMENTS

Figure 1:
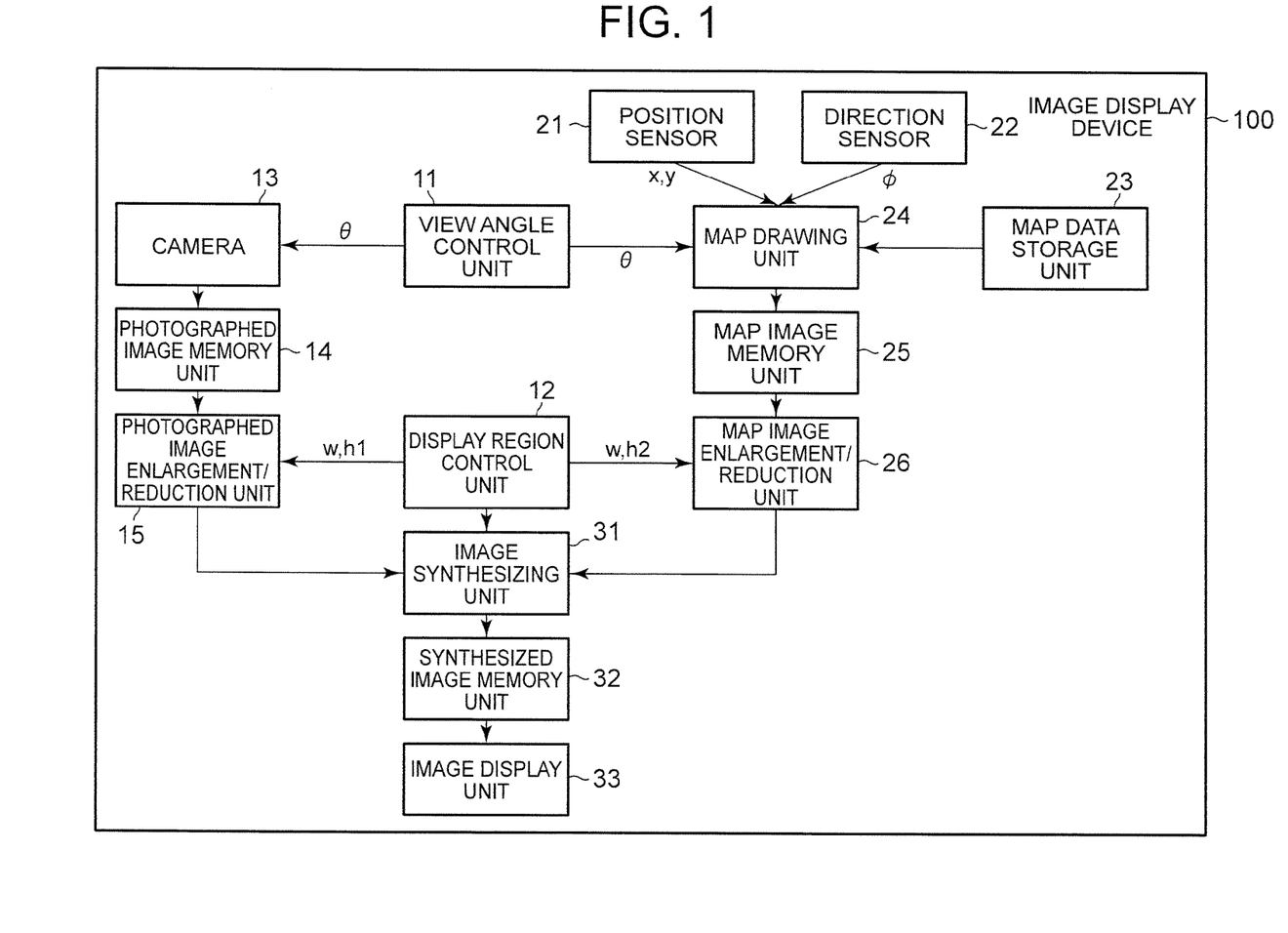
FIG. 1 is a block diagram of an image display device in an embodiment of the present invention.

Hereinafter, an image display device in an embodiment of the present invention will be described with reference to appended drawings. FIG. 1 is a block diagram of the image display device in the embodiment of the present invention. In FIG. 1, a view angle control unit 11 sets a horizontal view angle θ both to a camera 13 and a map drawing unit 24 in order to match the view angle of a photographed image to the view angle of a map image, where the photographed image and the map image are separately displayed on a screen divided into two upper and lower sections in a display region of an image display unit 33. In order to allocate the window regions, which are an upper region (width w, height h1) and a lower region (width w, height h2) of a display region (width w, height h=h1+h2) of the image display unit 33, to the photographed image and the map image, respectively, a display region control unit 12 sets the window regions, (w, h1) and (w, h2), to a photographed image enlargement/reduction unit 15 and a map image enlargement/reduction unit 26, respectively.

The camera 13 takes the photographed image corresponding to the horizontal view angle θ with a focal length adjusted and a photographed image memory unit 14 stores the photographed image taken by the camera 13. The photographed image enlargement/reduction unit 15 enlarges or reduces the photographed image so that the photographed image matches the upper window region (w, h1) set by the display region control unit 12 and outputs the photographed image to an image synthesizing unit 31.

A position sensor 21 measures position information (x, y) composed of a latitude x and a longitude y where the camera 13 is located, and a direction sensor 22 measures an azimuth angle φ of an optical axis through the center of the lens of the camera 13. A map data storage unit 23 stores map data necessary to draw a map. A map drawing unit 24 reads the map data around the imaging range of the camera 13 on the basis of the position information (x, y). Additionally the map drawing unit 24 processes and draws the map image so that the view angle θ and the azimuth angle φ match the view angle θ and the azimuth angle φ of the photographed image taken by the camera 13. A map image memory unit 25 stores the map data drawn by the map drawing unit 24. A map image enlargement/reduction unit 26 cuts out and enlarges or reduces the map image so that the map image matches the lower window region (w, h2) set by the display region control unit 12 and then outputs the map image to the image synthesizing unit 31. The image synthesizing unit 31 vertically connects the photographed image to the map image to create a synthesized image and stores the synthesized image into a synthesized image memory unit 32. The image display unit 33 displays the synthesized image.

Figure 2:
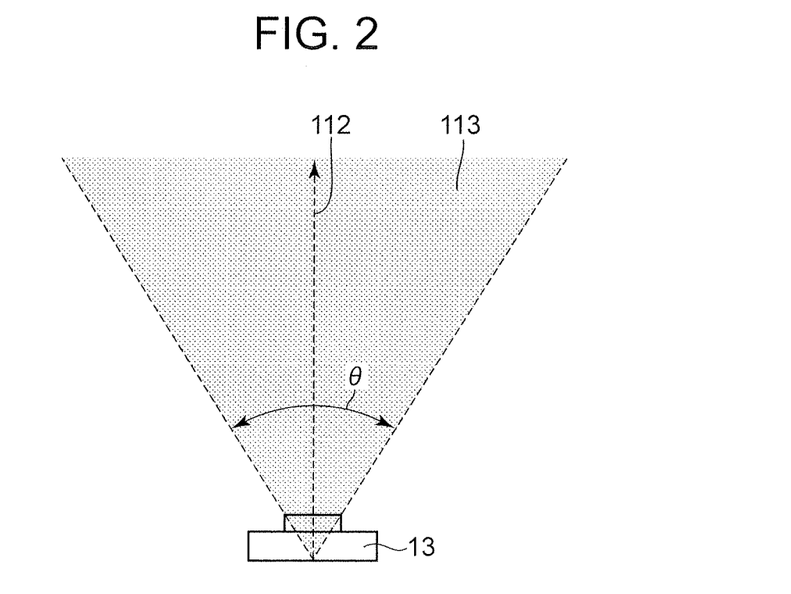
FIG. 2 is an explanatory diagram illustrating a view angle of the image display device in the embodiment of the present invention.

Hereinafter, the operation will be described in detail below. The view angle control unit 11 is a storage device such as a ROM for accumulating one or more predetermined angles as horizontal view angles θ which are parameters determining the imaging range of the camera 13. A user is able to select and specify one view angle θ out of the plurality of accumulated view angles by dial control or the like. FIG. 2 is a diagram illustrating the view angle θ of an image display device 100 in an embodiment of the present invention. In FIG. 2, when the camera 13 is horizontally positioned, the view angle θ is the apex angle of an isosceles triangle of imaging ranges 113 on both sides of an imaging direction 112, which is the direction of the optical axis through the center of the camera lens. In this regard, the view angle θ ranges as follows: 0<θ<180°.

Figure 3:
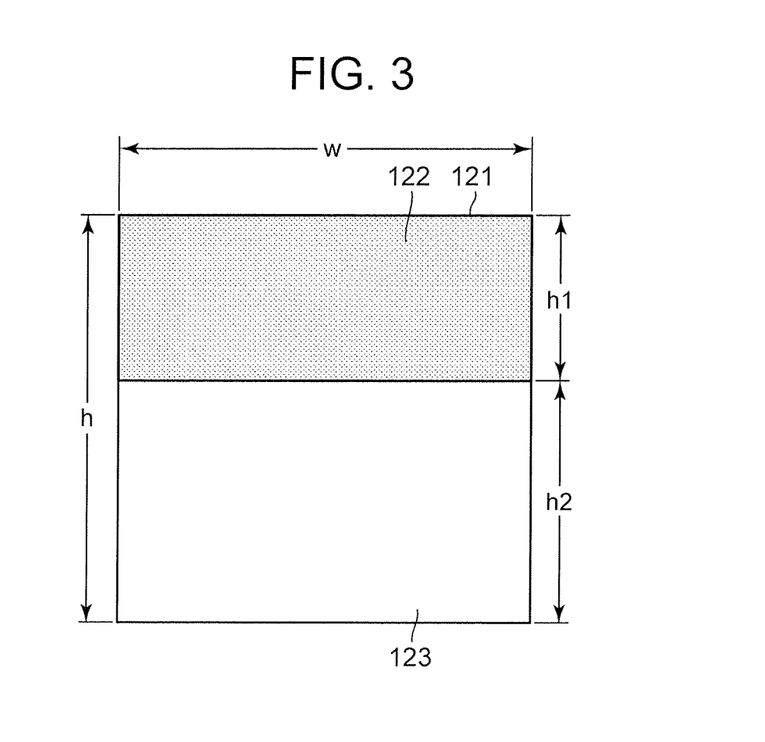
FIG. 3 is an explanatory diagram illustrating the display regions of a photographed image and a map image of the image display device in the embodiment of the present invention.

The display region control unit 12 is a storage device such as a ROM for accumulating the number of pixels in the horizontal and vertical directions of each predetermined divided region in order to allocate divided regions, which are acquired by dividing the display region of the image display unit 33 into an upper section and a lower section, to the display region of the photographed image and the display region of the map image, respectively. FIG. 3 is a diagram illustrating the display region of the photographed image and the display region of the map image of the image display device 100 in the embodiment of the present invention. In this regard, in FIG. 3, it is assumed that an entire display region 121 is divided into an upper section and a lower section: the upper section is a photographed image display region 122 and the lower section is a map image display region 123 and that the number of pixels in the horizontal direction and the number of pixels in the vertical direction of the entire display region 121 are denoted by w and h (=h1+h2), respectively: h1 is the number of pixels in the vertical direction of the photographed image display region 122 in the upper section and h2 is the number of pixels in the vertical direction of the map image display region 123 in the lower section.

The camera 13 is a so-called "digital camera with a zoom function," which reads the view angle θ stored in the view angle control unit 11, adjusts the focal length of the lens so that the view angle is equal to θ, converts a photographed image taken by an imaging element such as a CCD at predetermined regular time intervals to RGB data, and writes the RGB data into the photographed image memory unit 14. The photographed image memory unit 14, which is a storage device such as a DRAM for accumulating photographed images, primarily stores the taken photographed images in the form of RGB data.

The photographed image enlargement/reduction unit 15 reads the size of the photographed image display region 122 from the display region control unit 12, reads the photographed image from the photographed image memory unit 14, and creates RGB data of the photographed image enlarged or reduced so as to match the size of the photographed image display region 122. For example, when the photographed image has a size of W [pixels] in the horizontal direction and H [pixels] in the vertical direction and the photographed image display region 122 has a size of w [pixels] in the horizontal direction and h1 [pixels] in the vertical direction, the photographed image is enlarged to (w/W) times in the horizontal direction and (h1/H) times in the vertical direction.

Figure 4:
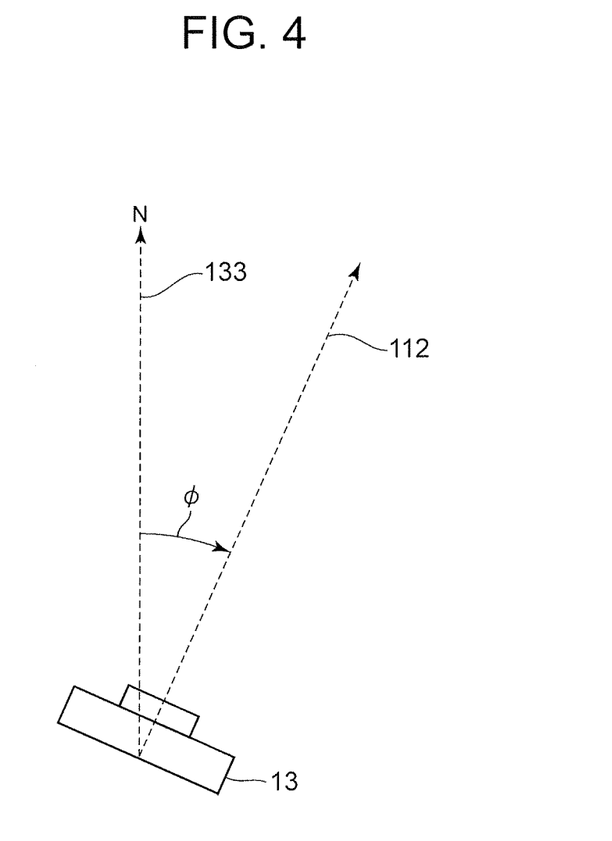
FIG. 4 is an explanatory diagram illustrating the azimuth angle of the imaging direction of a camera on the image display device in the embodiment of the present invention.

The position sensor 21 is a sensor device which continuously measures latitude/longitude data at predetermined regular time intervals by using the global positioning system (GPS) and communicates the position information (x, y) of the camera 13 through serial communication or the like to the outside. The direction sensor 22 is a sensor device which continuously measures an azimuth angle based on north at predetermined regular time intervals by using an electronic compass and communicates the azimuth angle φ in the imaging direction of the optical axis through the center of the lens of the camera 13 through serial communication or the like to the outside. FIG. 4 is a diagram illustrating the azimuth angle φ in the imaging direction of the camera 13 on the image display device 100 in the embodiment of the present invention, where an angle between the imaging direction 112 of the camera 13 and the true north direction (N) 133 is the azimuth angle φ.

The map data storage unit 23 is a storage device such as a flash memory for accumulating map data necessary to draw a map. The map drawing unit 24 reads the position information (x, y) of the camera 13 and the azimuth angle φ of the camera 13 from the position sensor 21 and the direction sensor 22, respectively, via serial communication and reads the view angle θ stored in the view angle control unit 11. In addition, the map drawing unit 24 reads the map data around the imaging range of the camera 13 from the map data storage unit 23 according to the position information (x, y) of the camera 13, the azimuth angle φ, and the view angle θ, and processes and draws the map image so that the view angle θ and the azimuth angle φ match the view angle θ and the azimuth angle φ of the photographed image taken by the camera 13. The map image memory unit 25, which is a storage device such as a DRAM for accumulating map images, primarily stores the drawn map images in the form of RGB data.

Figure 5:
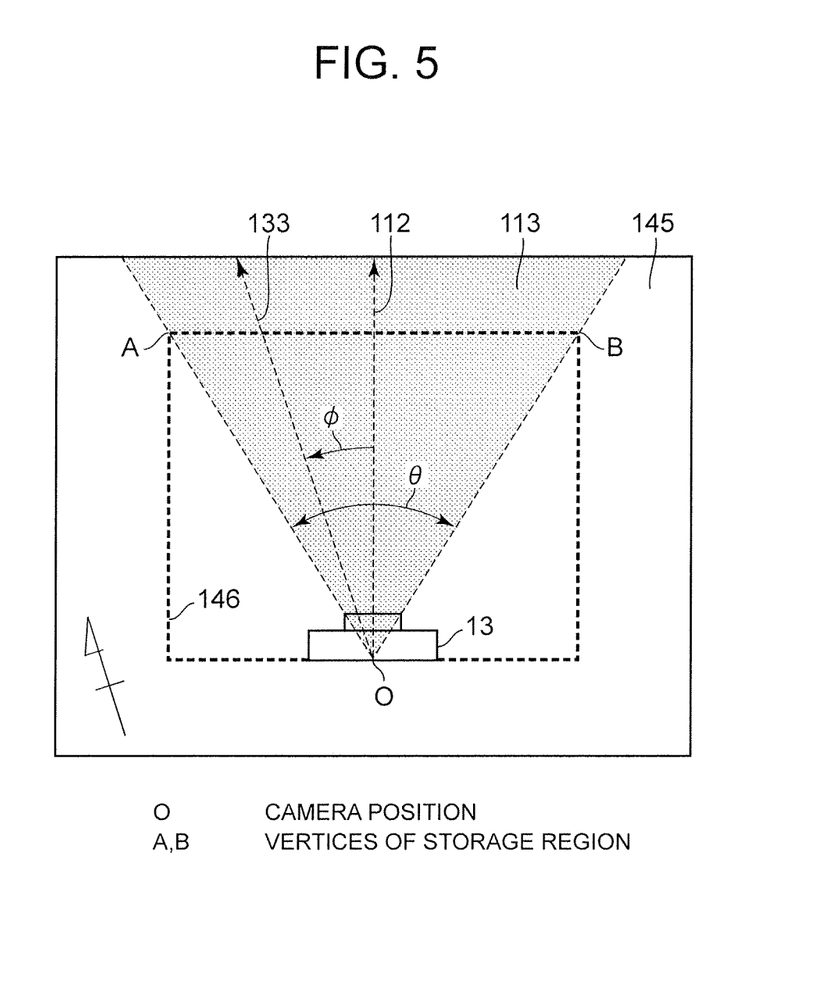
FIG. 5 is an explanatory diagram illustrating a map around the imaging range of the camera on the image display device and a storage region of the map image in the embodiment of the present invention.

FIG. 5 is a diagram illustrating an imaging range vicinity map 145 of the camera 13 and a map image storage region 146 of the image display device 100 in the embodiment of the present invention. In FIG. 5, when the camera 13 is positioned so that the imaging direction 112 of the camera 13 is just above the map with the position of the camera 13 on the map calculated from the latitude/longitude data, which is the position information (x, y) of the camera 13, as the camera position O, there are illustrated: an imaging range 113 on the map in the case of a view angle θ; a true north direction 133 on the map in the case of an azimuth angle φ; the imaging range vicinity map 145 which is a map rotated by the azimuth angle φ about the camera position O; and the map image storage region 146 which is a rectangular region having the camera position O on its side with an arbitrary point A on the border of the imaging range 113 and a point B symmetrical to the point A with respect to the imaging direction 112 as vertices. The map drawing unit 24 converts the map image in the image storage region 146 to RGB data and writes the RGB data into the map image memory unit 25.

The map image enlargement/reduction unit 26 reads the size of the map image display region 123 from the display region control unit 12, reads the map image from the map image memory unit 25, and creates the RGB data of the map image which has been enlarged or reduced to match the size of the map image display region 123. For example, when the map image has a size of M [pixels] in the horizontal direction and N [pixels] in the vertical direction and the map image display region 123 has a size of w [pixels] in the horizontal direction and h2 [pixels] in the vertical direction, the map image is enlarged to (w/M) times in the horizontal direction and (h2/N) times in the vertical direction.

The image synthesizing unit 31 reads the RGB data of the photographed image created by the photographed image enlargement/reduction unit 15 and the RGB data of the map image created by the map image enlargement/reduction unit 26, creates a synthesized image by connecting the RGB data in the upper and lower positions, and writes the synthesized image in the form of RGB data into the synthesized image memory unit 32. The synthesized image memory unit 32, which is a storage device such as a DRAM for accumulating synthesized images, primarily stores the created synthesized image in the form of RGB data. The image display unit 33, which is a display such as a liquid-crystal display for displaying an image, reads and displays the RGB data of the synthesized image stored in the synthesized image memory unit 32 at regular time intervals.

Figure 6:
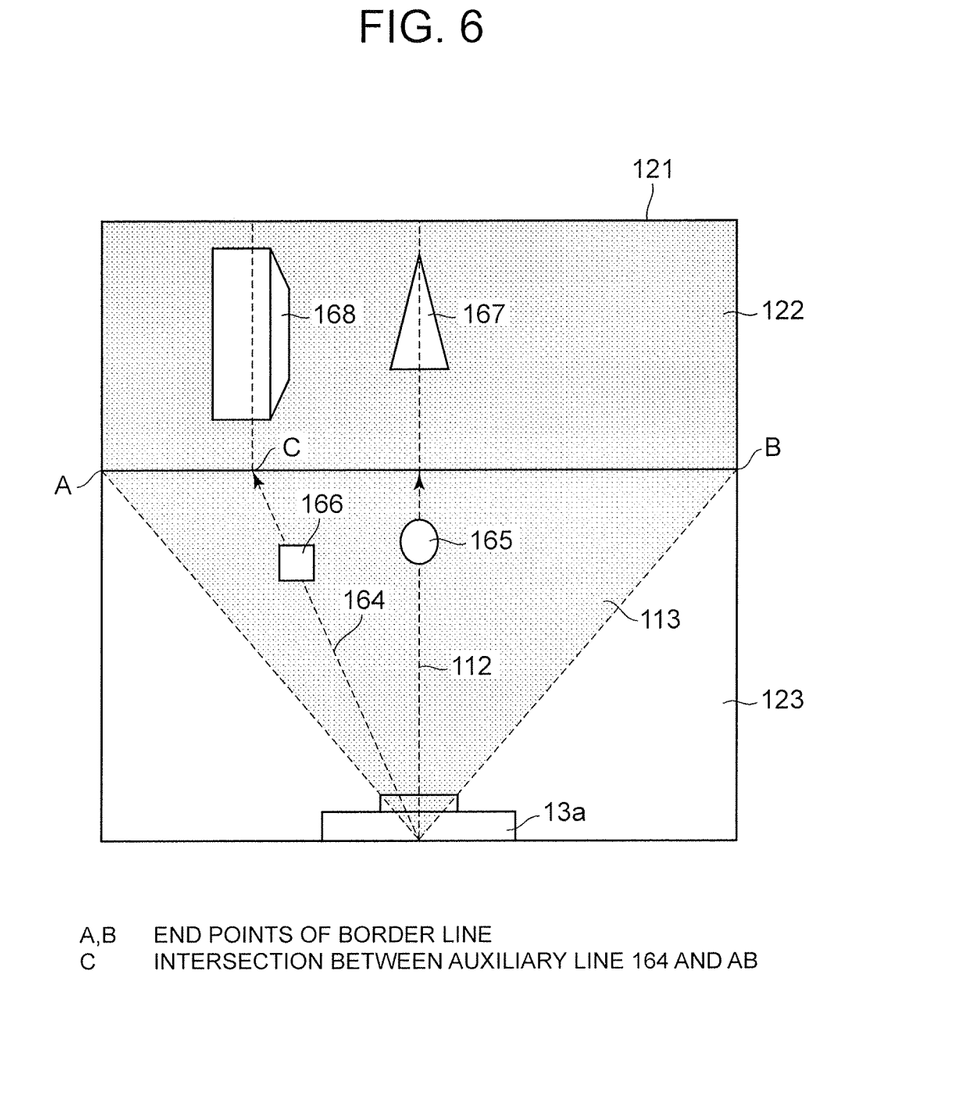
FIG. 6 is an explanatory diagram illustrating a synthesized image of the photographed image and the map image on the image display device in the embodiment of the present invention.

FIG. 6 is a diagram illustrating the synthesized image of the photographed image and the map image on the image display device 100 in the embodiment of the present invention. In FIG. 6, the entire display region 121 is created by connecting the photographed image display region 122 and the map image display region 123 in the upper and lower positions. In the map image display region 123, there are displayed a camera image 13a representing the camera position on the map, a tower 165 located in the camera imaging direction 112 within the camera imaging range 113, a building 166 located in a direction different from the imaging direction 112, and an auxiliary line 164 representing the direction of the building 166.

In this regard, assuming end points A and B of the border line between the photographed image and the map image and an intersection C between the auxiliary line 164 and the border line AB, the view angle θ of the photographed image matches the view angle θ of the map image at the end points A and B and therefore the false azimuth angle of the photographed image matches the false azimuth angle of the map image also at the point C on the border line AB. Accordingly, in the photographed image display region 122, a tower 167 on the photographed image corresponding to the tower 165 on the map is displayed on the extended line in the imaging direction 112. Moreover, a building 168 on the photographed image corresponding to the building 166 on the map is displayed in a position above the intersection C.

Figure 7:
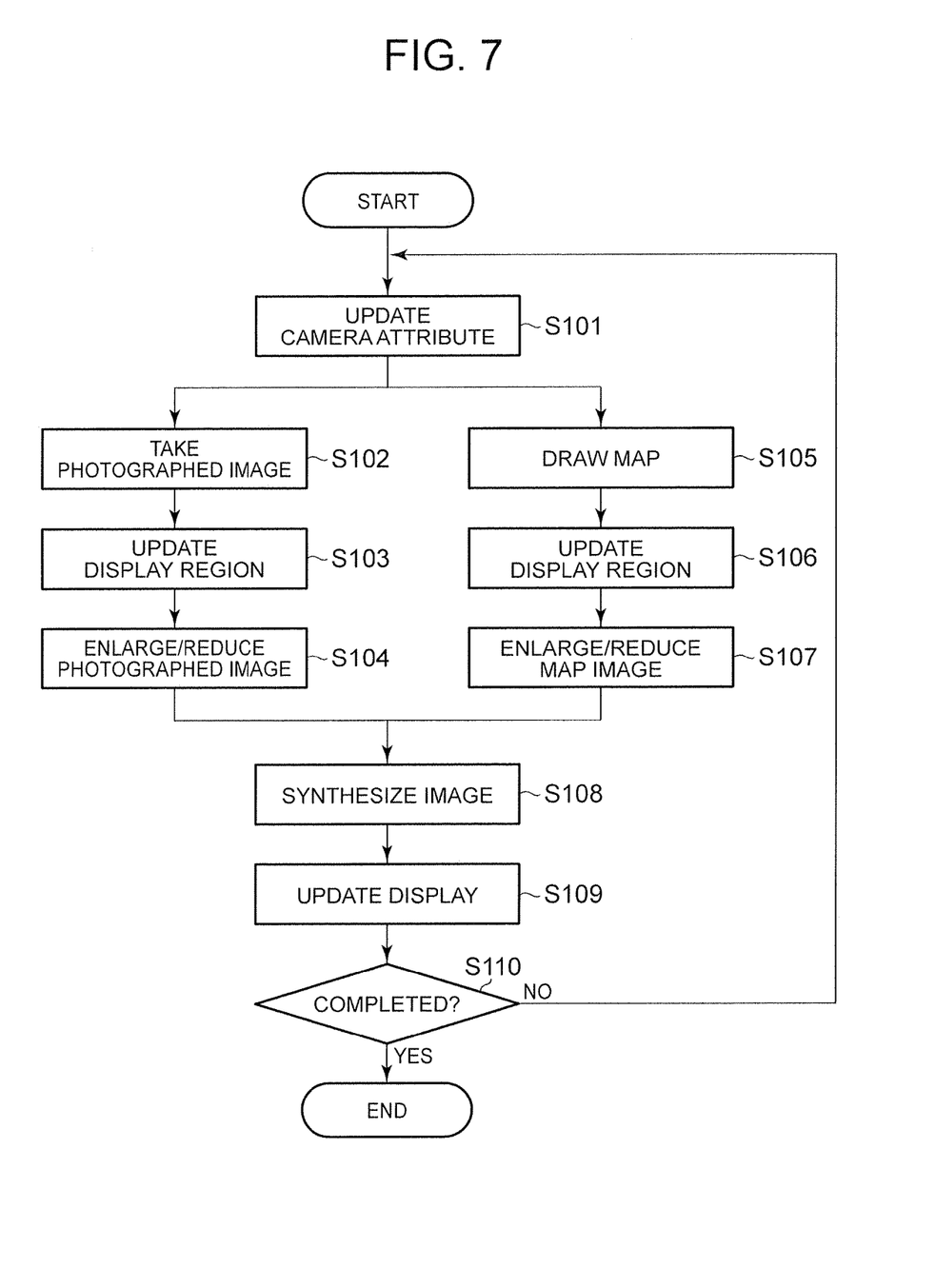
FIG. 7 is a flowchart for describing the processing of the image display device in the embodiment of the present invention.

The following describes the processing operation of the image display device having the above configuration. FIG. 7 is a flowchart of the processing of the image display device 100 in the embodiment of the present invention. First, in step S101, the camera 13 and the map drawing unit 24 read the view angle θ from the view angle control unit 11. Moreover, the map drawing unit 24 reads the latitude/longitude data as position information (x, y) of the camera from the position sensor 21 and the azimuth angle φ from the direction sensor 22.

Subsequently, in step S102, the camera 13 writes the photographed image taken with the view angle θ by the camera 13 into the photographed image memory unit 14. Thereafter, in step S103, the photographed image enlargement/reduction unit 15 reads the number of pixels w in the horizontal direction and the number of pixels h1 in the vertical direction as the size of the photographed image display region 122 from the display region control unit 12. Furthermore, in step S104, the photographed image enlargement/reduction unit 15 reads the photographed image from the photographed image memory unit 14 and enlarges or reduces the photographed image to achieve matching of the number of pixels in the horizontal direction to w and the number of pixels in the vertical direction to h1.

Moreover, in step S105, the map drawing unit 24 reads the map data from the map data storage unit 23, processes and draws the imaging range vicinity map 145 so that the processed map matches the view angle θ, the imaging direction 112, and the imaging range 113 of the camera, and writes the map image in the image storage region 146 into the map image memory unit 25. Thereafter, in step S106, the map image enlargement/reduction unit 26 reads the number of pixels w in the horizontal direction and the number of pixels h2 in the vertical direction as the size of the map image display region 123 from the display region control unit 12. Further, in step S107, the map image enlargement/reduction unit 26 reads the map image from the map image memory unit 25 and enlarges or reduces the map image to achieve matching of the number of pixels in the horizontal direction to w and the number of pixels in the vertical direction to h2.

In step S108, the image synthesizing unit 31 reads the photographed image created in step S104 into the photographed image display region 122 and the map image created in step S107 into the map image display region 123, creates a synthesized image in the entire display region, and writes the synthesized image into the synthesized image memory unit 32. Subsequently, in step S109, the image display unit 33 reads the synthesized image from the synthesized image memory unit 32 and updates the content on the display. Lastly, the completion is confirmed in step S110. Unless the operation is completed, the control returns to step S101.

As described hereinabove, according to the embodiment, a three-dimensional photographed image and a two-dimensional map image are processed and displayed into an image having continuity so that the view angle of the three-dimensional photographed image matches the view angle of the two-dimensional map image. Therefore, a user is able to understand at a glance the entire correspondence relationship between the photographed image and the map image without specifying an arbitrary structural object. Although the map drawing unit 24 processes the map image so that the view angle of the map image matches the view angle of the photographed image in the above embodiment, alternatively the map image enlargement/reduction unit 26 may perform the processing.

In addition, each functional block employed in the description of the above embodiment may typically be implemented as an LSI constituted by an integrated circuit. These functional blocks may be individual chips or partially or totally contained on a single chip. The term "LSI" is adopted herein, but this may also be referred to as "IC," "system LSI," "super LSI," or "ultra LSI" depending on differing extents of integration. The method of implementing integrated circuitry is not limited to LSI, and implementation by means of dedicated circuitry or a general-purpose processor may also be used. It is also possible to use of a field programmable gate array (FPGA) or a reconfigurable processor where connections and settings of circuit cells in an LSI can be reconfigured. Further, if a new integrated circuit implementation technology comes out to replace LSI as a result of the development of semiconductor technology or a derivative other technology, naturally the functional blocks may be integrated using that technology. For example, application of biotechnology is possible.

INDUSTRIAL APPLICABILITY

The image display device of the present invention has an advantageous effect of enabling a user to understand at a glance the entire correspondence relationship between a three-dimensional photographed image and a two-dimensional map image in a position where the photographed image is taken when the photographed image and the map image are separately displayed on a screen, and is useful in the field of design and manufacturing of an in-vehicle car navigation device, a pedestrian navigation device, an in-vehicle information terminal device, and a portable information terminal device.

The invention claimed is:

1. An image display device which separately displays a photographed image taken by an imaging unit and a map image on a divided screen, the image display device comprising:
    a unit which acquires a view angle, an imaging position, and an imaging direction of the imaging unit; and
    a unit which processes the map image so that the direction of the map image of the vicinity of the acquired imaging position matches the acquired imaging direction and so that the view angle of the map image matches the acquired view angle of the imaging unit, wherein:
    the screen is divided into two upper and lower regions to display the photographed image in the upper divided region and to display the processed map image in the lower divided region;
    the view angle of the imaging unit is displayed together with the processed map image in the lower divided region;
    an auxiliary line representing the direction of an object on the map image is superposed on the processed map image; and
    a corresponding object on the photographed image is displayed in a position immediately above an intersection between the auxiliary line and a border line between the upper and lower regions.

2. The image display device according to claim 1 wherein the auxiliary line intersects a point on a lower portion of the object on the map image, and a point on a lower portion of the object on the photographed image, which corresponds to the point on the lower portion of the object on the map image, is displayed immediately above the intersection between the auxiliary line and the border line between the upper and lower regions.

3. The image display device according to claim 1 wherein the auxiliary line includes an arrow pointing to the object on the photographed image.

4. The image display device according to claim 3 wherein the arrow pointing to the object on the photographed image is displayed immediately below the border line.

5. The image display device according to claim 1, further comprising the screen.

6. The image display device according to claim 1, further comprising the imaging unit.

7. The image display device according to claim 1, further comprising a map data storage unit configured to store data corresponding to the map image.

8. The image display device according to claim 7, further comprising a photographed image enlargement/reduction unit, which in operation, receives the height and the width of the upper region of the screen from the display region control unit and enlarges or reduces the photographed image so that a height and a width of the photographed image matches the height and the width of the upper region of the screen.

9. The image display device according to claim 7, further comprising a map image enlargement/reduction unit, which in operation, receives the height and the width of the lower region of the screen from the display region control unit and enlarges or reduces the map image so that a height and a width of the map image matches the height and the width of the lower region of the screen.

10. The image display device according to claim 1, further comprising a display region control unit, which in operation, sets a height and a width of the upper region of the screen and sets a height and a width of the lower region of the screen.

11. The image display device according to claim 1 wherein a height of the screen is equal to a sum of the height of the upper region of the screen and the height of the lower region of the screen.

12. A method of displaying a photographed image taken by an imaging unit and a map image on a screen divided into an upper region and a lower region, the method comprising:
    acquiring a view angle, an imaging position, and an imaging direction of the imaging unit; and
    processing the map image so that the direction of the map image of the vicinity of the acquired imaging position matches the acquired imaging direction and so that the view angle of the map image matches the acquired view angle of the imaging unit;
    displaying the photographed image in the upper region of the screen;
    displaying the view angle of the imaging unit together with the processed map image in the lower region of the screen;
    displaying an auxiliary line representing the direction of an object on the map image superposed on the processed map image; and
    displaying a corresponding object on the photographed image in a position immediately above an intersection between the auxiliary line and a border line between the upper and lower regions.

13. The method according to claim 12 wherein the auxiliary line intersects a point on a lower portion of an object on the map image, and a point on a lower portion of the object on the photographed image, which corresponds to the point on the lower portion of the object on the map image, is displayed immediately above the intersection between the auxiliary line and the border line between the upper and lower regions.

14. The method according to claim 12, further comprising displaying an arrow on the auxiliary line, the arrow pointing to the object on the photographed image.

15. The method according to claim 14 wherein the arrow pointing to the object on the photographed image is displayed immediately below the border line.

16. The method according to claim 12, further comprising receiving data corresponding to the photographed image from the imaging unit.

17. The method according to claim 12, further comprising receiving data corresponding to the map image from a map data storage unit.

18. The method according to claim 12, further comprising setting a height and a width of the upper region of the screen and a height and a width of the lower region of the screen.

19. The method according to claim 18, further comprising:
   receiving the height and the width of the upper region of the screen; and
   enlarging or reducing the photographed image so that a height and a width of the photographed image matches the height and the width of the upper region of the screen.

20. The method according to claim 18, further comprising:
   receiving the height and the width of the lower region of the screen; and
   enlarging or reducing the map image so that a height and a width of the map image matches the height and the width of the lower region of the screen.

* * * * *